United States Patent Office 2,727,003
Patented Dec. 13, 1955

2,727,003

METHOD OF INHIBITING CORROSION OF METALS

William B. Hughes, Bartlesville, Okla., assignor to Cities Service Research and Development Company, New York, N. Y., a corporation of New Jersey No Drawing. Application May 1, 1953,
Serial No. 352,567

6 Claims. (Cl. 252—8.55)

This invention relates to inhibiting corrosion of metals and is more particularly concerned with improved compositions and processes for treating natural petroleum oil-brine mixtures to reduce their corrosive action upon production, transmission, storage and other oil field equipment.

It is a well-known fact that many oil producing formations yield with the crude oil a brine which is extremely corrosive in its action upon metal tubing, casings, pumps, and other oil producing and collection equipment, and that this type of corrosion is particularly noticeable in wells producing brines containing dissolved hydrogen sulfide, carbon dioxide, or other acidic materials.

Various compositions have been proposed in the past for inhibiting such corrosion, some water-soluble, and some oil-soluble. Since it has been found that if a sufficient amount of inhibitor is incorporated into either the brine phase or the oil phase of the well fluids, corrosion may be substantially inhibited, it has been the practice to use water-soluble inhibitors, such as those disclosed in U. S. Patent 2,496,596 to Moyer and Hersh, in wells producing only small amounts of brine per barrel of well fluid, and conversely, oil-soluble inhibitors in wells producing only small amounts of oil per barrel of well fluid. By so proceeding it is possible to reduce to a minimum the amount of inhibitor required to effectively reduce corrosion.

It is an object of this invention to provide a series of oil-soluble compounds which are highly effective in reducing corrosion in wells producing corrosive brines, and particularly useful for substantially preventing corrosion in wells producing but small quantities of oil per barrel of well fluid.

I have now found that products having the above desirable characteristics may be produced by first reacting diethylene triamine with an equimolar quantity of an aldehyde, heating to drive the reaction to completion and to take overhead water formed in the reaction, whereby to form an imidazolidine ring containing two of the three nitrogen atoms of the diethylene triamine, and then converting the remaining amino group to an amide by heating with one mol of a carboxylic acid until the water formed by the reaction is eliminated. The final product has the generic formula

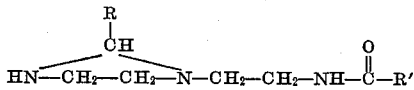

in which R and R' may be alkyl or aryl groups of hydrogen. In order to be effective as a corrosion inhibitor, however, the radicals R and R' together must contain a total of at least six carbon atoms.

The aldehyde which is used to form the imidazolidine ring may be aliphatic, such as formaldehyde, acetaldehyde, butyraldehyde, heptaldehyde, ethyl hexaldehyde, and the like, or aromatic, such as benzaldehyde and its homologues. Heterocyclic aldehydes such as furfural are, however, generally unsatisfactory. The acid used to form the amide may be any carboxylic acid, such as acetic, oleic, benzoic, and other aliphatic or aromatic acids.

In preparing my compounds, I prefer to mix equimolar quantities of aldehyde and diethylene triamine and add benzene or toluene, in order to make the mixture more fluid, and also as entrainers to form azeotropes to carry overhead the water formed in the reaction. The mixture is then heated until water ceases to evolve overhead, the entrainer being continuously returned to the reaction vessel, and may then be heated at about 190° C. for about two hours in order to be quite sure that the reaction has been driven to completion, although this latter heating is not strictly necessary. Caution should be observed in adding the aldehyde to the amine as the reaction takes place spontaneously with the evolution of considerable heat, and if the aldehyde is added too fast, the mixture tends to boil over. The acid is then added, and the mixture is then heated until water ceases to evolve overhead, after which the entrainer such as benzene or toluene is distilled off, leaving the desired product in the reaction vessel.

The effectiveness of my compositions in inhibiting the corrosiveness of oil field brines may be better and more fully understood by reference to certain tests which I have conducted using natural brines taken from producing wells together with oil from the same well. The test procedure, as hereafter described, involved a measurement of the corrosive action of these well fluids, as inhibited with the compositions described above, upon test strips of hot rolled steel, and a comparison thereof with the results obtained by subjecting identical test strips to the corrosive action of well fluids alone.

In testing the compositions, cleaned and numbered one-quart bottles were purged with natural gas. Oil saturated with hydrogen sulfide by bubbling the gas through the liquid for about three hours was added to the half-full mark on the bottle. Brine containing carbon dioxide and hydrogen sulfide in varying amounts as received from the well, was then added to almost completely fill the bottle. A quantity of my new compounds was then added to each bottle in an amount of 50 parts per million, based on the oil content of the bottle. The weighed steel strips were then affixed in such manner that the mid-point of the test strip was approximately at the interfacial level of the brine and oil.

At all times precautions were maintained to exclude air from the bottles by frequent and liberal purging with oxygen-free natural gas. The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone. The dry strips were then reweighed to determine the weight loss; blanks were run to provide a basis for comparison.

Changes in the weight of the test strips during the corrosion test were taken as a measurement of the effectiveness of the inhibitor compositions, expressed as a protection percentage. Thus if the blank lost, for example, 100 mg. during the course of the test and the test strip subjected to the brine and oil containing my inhibiting compositions lost 5 mg., the per cent effectiveness would be 95 per cent. In the same manner if the test strip exposed to the uninhibited well fluids lost say 50 mg., while the loss of the test strip exposed to the inhibited well fluids was 4 mg., then the percentage of protection would be 92 per cent.

Results of a typical test run are set forth in the following table, at inhibitor concentrations of 50 p. p. m.

*Table*

| Inhibitor | Test strip wt. loss, mg. | Percent Protection |
|---|---|---|
| none | 318.4 | 0 |
| DETA, HCHO, Acetic acid | 291.1 | 8.6 |
| DETA, HCHO, Oleic acid | 4.2 | 98.7 |
| DETA, HCHO, Benzoic acid | 115.4 | 73.7 |
| DETA Ethyl hexaldehyde, acetic acid | 12.2 | 96.2 |
| DETA Ethyl hexaldehyde, oleic acid | 4.4 | 98.6 |
| DETA, Ethyl hexaldehyde, benzoic acid | 45.0 | 85.9 |
| DETA, Benzaldehyde, acetic acid | 30.7 | 90.4 |

As will be observed, it is apparently necessary that either the acid or the aldehyde employed contain at least 6 carbon atoms, since for some reason compositions, such as the DETA, HCHO, acetic acid formulation, in which R and R' together contain less than 6 carbon atoms, do not exhibit much, if any, corrosion inhibiting qualities.

It should also be pointed out that the corrosiveness of oil well brines will vary from well to well, and the proportion of corrosion inhibiting agent added to the well fluids should also be varied from well to well. Thus, in some wells it may be possible to effectively control corrosion by the addition of as little as 10 p. p. m. of my new compositions to the well fluids, whereas in other wells, it may be necessary to add 200 p. p. m. or more.

In using my improved compositions for protecting oil well tubing, casing, and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

The nature of the inhibiting action of my improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of fifty parts per million or less based on the oil content of the well fluids.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what I claim as new and useful is:

1. The method of inhibiting corrosion of metals in contact with corrosive oil well fluids which comprises incorporating into the well fluids a small but sufficient quantity of a compound having the formula

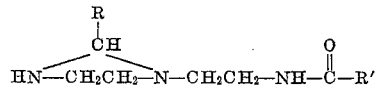

in which R and R' are selected from the group consisting of alkyl and aryl groups and hydrogen, and in which R and R' together contain at least six carbon atoms.

2. The method according to claim 1 in which R is hydrogen and R' is an oleic acid residue.

3. The method according to claim 1 in which R is an ethyl hexaldehyde residue and R' is $CH_3$.

4. The method according to claim 1 in which R is an ethyl hexaldehyde residue and R' is an oleic acid residue.

5. The method according to claim 1 in which R is an ethyl hexaldehyde residue and R' is a benzene ring.

6. The method according to claim 1 in which R is a benzene ring and R' is $CH_3$.

References Cited in the file of this patent

UNITED STATES PATENTS

| 2,468,163 | Blair | Apr. 26, 1949 |
| 2,643,227 | Hughes et al. | June 23, 1953 |
| 2,643,977 | Hughes | June 30, 1953 |
| 2,643,978 | Hughes | June 30, 1953 |
| 2,646,400 | Hughes | July 21, 1953 |